United States Patent [19]
Armstrong

[11] 3,972,247
[45] Aug. 3, 1976

[54] BICYCLE SHIFT MECHANISM
[76] Inventor: Allen E. Armstrong, 4 Turning Mill Road, Lexington, Mass. 02173
[22] Filed: Sept. 23, 1974
[21] Appl. No.: 508,042

[52] U.S. Cl. .............................. 74/489; 74/501 R; 74/534; 74/535; 280/236
[51] Int. Cl.² ...................... G05G 9/00; B23P 7/00; F16C 1/10; G05G 1/00
[58] Field of Search ................. 74/489, 501 R, 531, 74/534, 217 B, 157, 158, 142, 535; 280/236, 237, 238, 289

[56] References Cited
UNITED STATES PATENTS

| | | | |
|---|---|---|---|
| 2,785,586 | 3/1957 | Schwerdhofer | 74/489 |
| 3,104,559 | 9/1963 | Dotter | 74/489 |
| 3,332,295 | 7/1967 | Cummings et al. | 74/157 |
| 3,442,148 | 5/1969 | Jay | 74/489 |
| 3,499,346 | 3/1970 | Ishida et al. | 74/501 |
| 3,580,104 | 5/1971 | Yashiro | 74/535 |
| 3,701,546 | 10/1972 | Schwerdhofer et al. | 280/289 |
| 3,742,580 | 7/1973 | Sullivan, Jr. | 74/489 |

FOREIGN PATENTS OR APPLICATIONS

| | | | |
|---|---|---|---|
| 923,644 | 12/1954 | Germany | 74/489 |

*Primary Examiner*—Benjamin W. Wyche
*Assistant Examiner*—A. Russell Burke
*Attorney, Agent, or Firm*—Johnson, Dienner, Emrich & Wagner

[57] ABSTRACT

A control mechanism adapted for incrementally and positively controlling the displacement of a biassed member or the like associated with a bicycle gear-change transmission between a plurality of predetermined positions for effectuating changes in gear ratios of such transmission in response to unidirectional movement of an operator control lever of the control mechanism. In addition, the control mechanism is also, preferably, provided with an "overshift" arrangement which effectively and effortlessly enables an operator to shift the bicycle sprocket chain from one sprocket to another sprocket of larger diameter. In an alternate embodiment, the control mechanism is directly mounted on and connected to a derailleur type bicycle change-gear mechanism.

33 Claims, 16 Drawing Figures

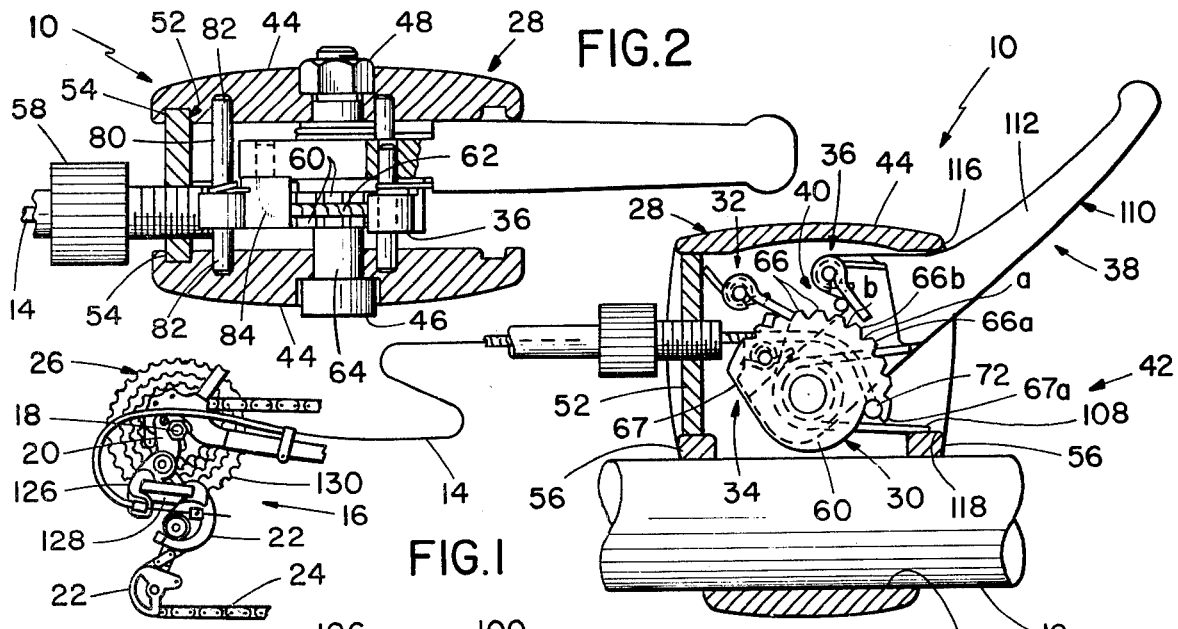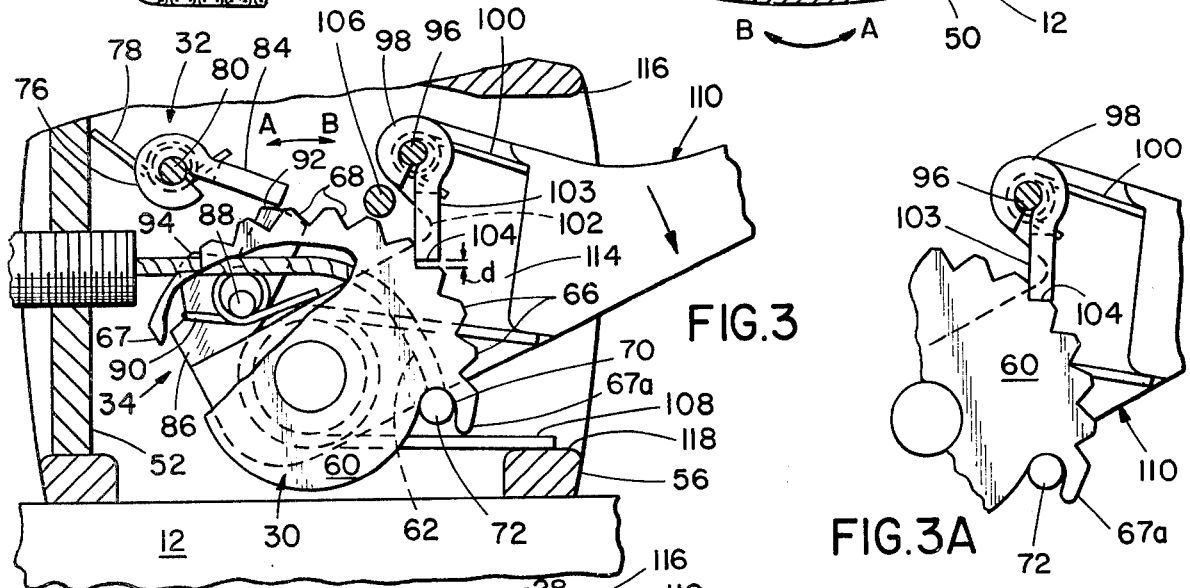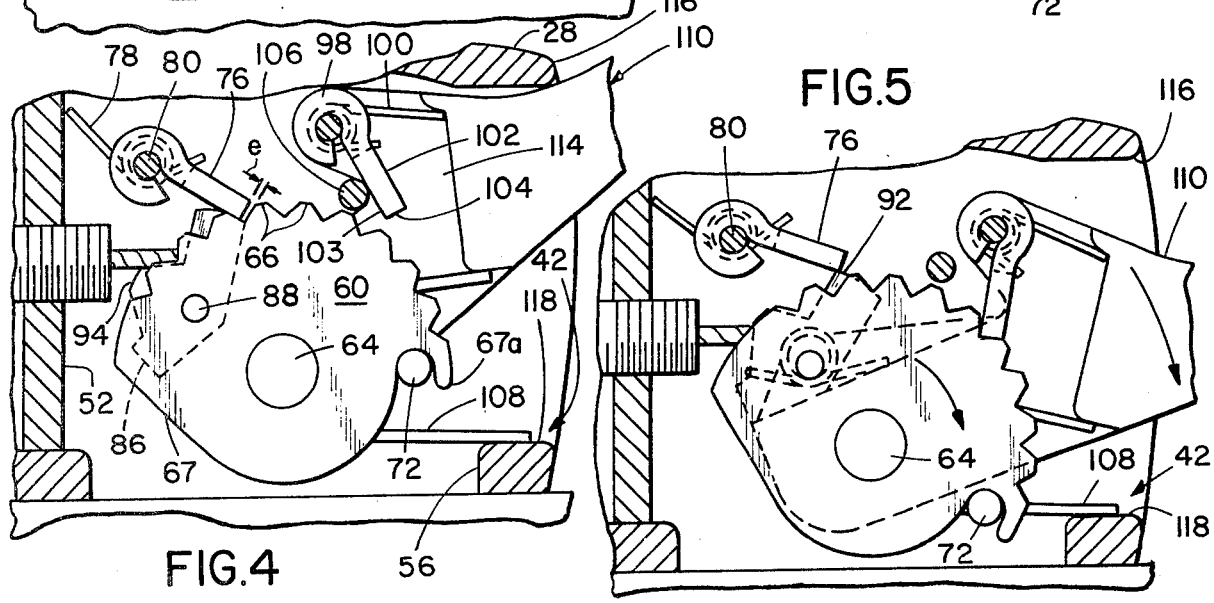

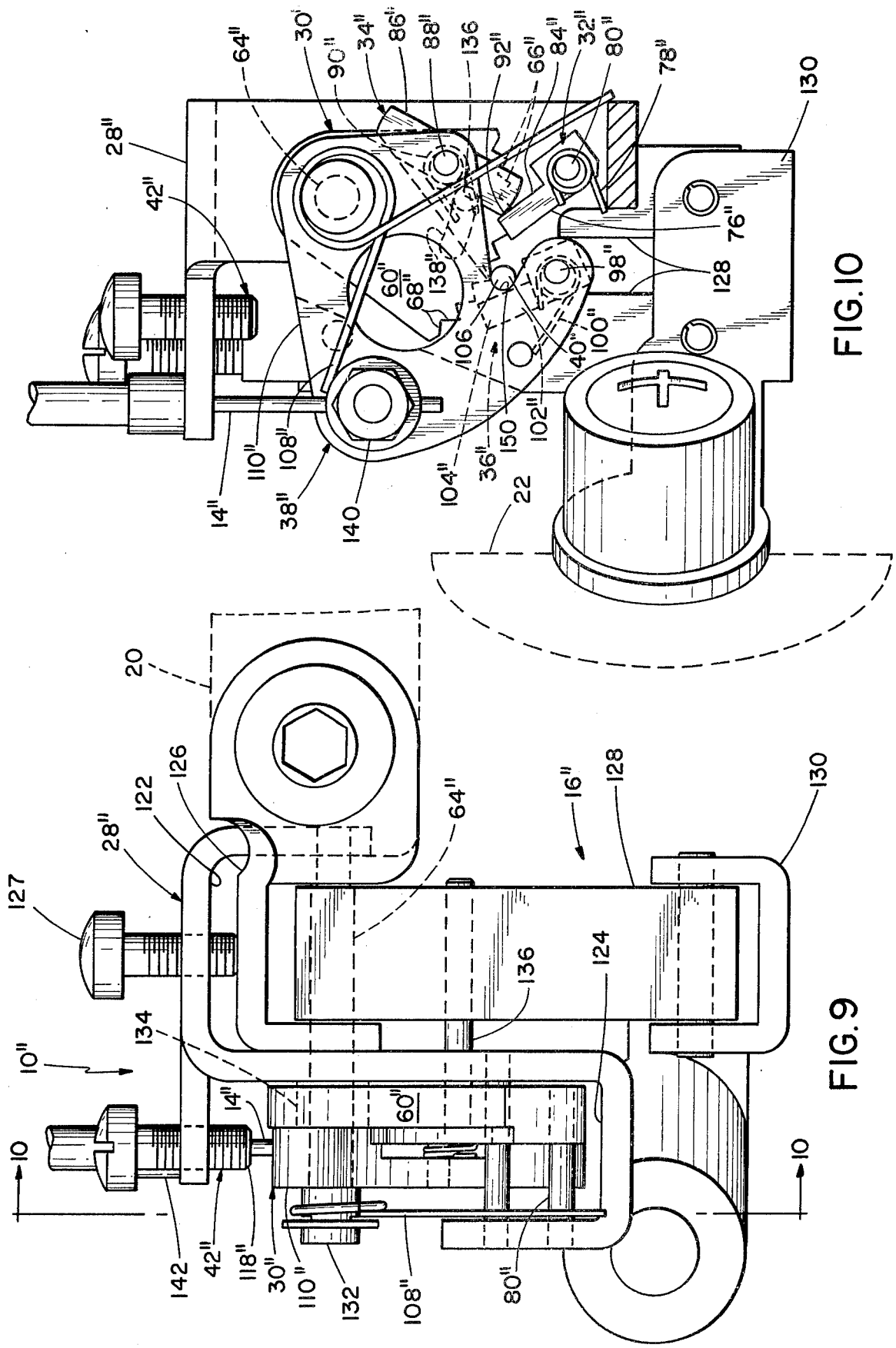

BICYCLE SHIFT MECHANISM

BACKGROUND OF THE INVENTION

1. Field of the Invention

This invention pertains to control mechanism for effecting changes in gear ratios of a gear-change transmission. More particularly, it relates to a bicycle control mechanism which is mountable as a unit on any convenient portion of the bicycle, and which positively indexes displacement of a member for effectuating changes in gear ratios in response to unidirectional movement of an operator control lever.

2. Description of the Prior Art

Several known mechanisms and methods exist for controlling the operation of bicycle gear-change transmissions. The more conventional units are operable on the well known chain-derailleur principle. Other units function on the principle of sliding gears, or moving elements which may comprise sprockets, or the like. All of the above mechanisms and methods of operation, however, share a common characteristic in that the change of gear ratios is effected by motion of the elements which is controlled by the displacement of a tensioned flexible cable or the like.

Present day bicycle control mechanisms which may accomplish such aforenoted types of changes in gear ratios are broadly classifiable into several general categories. One such category utilizes a friction-loaded lever-and-drum arrangement which is operable to effect control over the displacement of a tensioned cable. In this particular kind of control mechanism, no fixed gear positions are provided, and as a consequence the rider must shift by feel while at the same time making minute corrections until signs of improper alignment are no longer evident. The rider in shifting must also overcome the ordinarily high amount of friction imposed on the shift lever. Shifting gears with known types of mechanisms is therefore not entirely satisfactory, and involves in many instances an undue amount of time and effort.

In seeking to obviate such shortcomings, longer levers and reduced cable drum diameter have been used. Such mechanisms, however, have resulted in rather large total lever motion ranges which necessarily restrict the choice of mounting positions available on the bicycle. As a result, in certain of the friction-loaded lever-and-drum arrangement type of control mechanisms the rider is required to remove his hand from the handlebars in order to shift the gear ratio. Obviously, such an arrangement for shifting is relatively unsafe, not to mention inconvenient and troublesome in operation.

Another common type of present day bicycle control mechanism operates by virtue of a spring-detented lever-and-drum arrangement which also is effective to control the displacement of a cable to effect a desired shift in the gear ratio. Although this type differs from the aforementioned type in that fixed gear positions are provided, it nevertheless suffers from certain other drawbacks. That is, a detent force of a relatively large magnitude is ordinarily required to resist cable tensions that may occur in normal operation. However, such a detent force creates a condition which requires a relatively high degree of rider effort to accomplish a shift in gear ratio. Moreover, care must be exercised by the rider so as to avoid overshooting the intended gear during shifting. As a result, a less than completely satisfactory control mechanism is provided.

Still another type of conventional bicycle control mechainsm incorporates a ratchet mechanism, wherein the operating or gear shift lever follows the position of the cable drum as the former moves from position to position. This latter type of mechanism, however, is primarily used only in conjunction with the internal-hub gears of the planetary type, and, has not been successfully applied to the typical chain-derailleur system type of gear-change transmission. Furthermore, the range of positions attendant with the use of such an operating mechanism necessitates rather large total lever motion which correspondingly restricts quick rider access to the lever by reason of the uncertainty as to its location at any given time. In addition, such types of lever arrangements further restrict the available mounting positions on the bicycle, and quick rider access to the shift mechanism for the bicycle transmission is hindered and inconvenient.

An example of the last noted type of shift device for a bicycle gear-change transmission is disclosed in U.S. Pat. No. 2,785,586. Such type is effective to control the selector of variable speed gears for motor vehicles by a pulling action exerted on a Bowden cable. However, in such a device, by virtue of its construction, rather high impact loads on the pawls and ratchet teeth may be readily expected. Moreover, its manually operated control lever requires bidirectional movement to perform upshift and downshift operations. Hence, discomfort and loss of control may be encountered when an operator moves his hand around to the other side of such lever so as to bring about a particular shift. Further, if such a device is to be used with five or six-speed derailleurs, for example, tooth height would change cumulatively.

In addition to the aforenoted problems, it has been determined that known types of gear-change transmissions which utilize a tensioned flexible cable to control displacement of a biased transmission member to effect a change in gear ratios may suffer certain shortcomings in that they are subject to cable stretch. As cable stretch occurs, it becomes more difficult to accurately control the movement of such transmission member. Moreover, cable stretch is more pronounced whenever cable length is relatively large. Hence, if a control mechanism is mounted on the handlebars, accurate movement of the transmission is more difficult to obtain. Additionally, a Bowden type cable is subject to friction losses which may also tend to make accurate control of the cable more difficult.

A bicycle gear-change transmission which includes a chain derailleur type of mechanism also experiences a degree of reluctance which is created by the bicycle sprocket chain. That is, chain reluctance normally occurs when the spring-biased cage which mounts the sprocket chain is pivotally movable laterally with respect to the principle axis of the sprocket chain so that the sprocket chain moves to a gear sprocket having a larger diameter. During such travel, the chain sprocket must be forced so that the chain will be in proper alignment with the desired sprocket. The intended action, however, may be hindered because the sprocket chain has a tendency to remain on its present sprocket which is sufficient to impair the desired relatively smooth and quick transfer of such chain from one gear to the next. When the cage is moved far enough to cause the chain to shift, the chain will not be properly aligned with the new sprocket, having been moved too far. Such alignment may cause the chain and gear sprocket to function in a noisy and self-destructive manner. Mention should be made, however, that the above problem concerning chain reluctance does not exist when the sprocket chain is laterally moved to a sprocket having a smaller diameter.

Attempts to prevent such sprocket chain misalignment have resulted in the necessity of "overshooting" the desired chain position. Overshooting is achieved by having the sprocket chain laterally moved a certain distance past the position for the intended gear sprocket. In this manner, the chosen sprocket chain is enabled to ride up and then drop onto the gear teeth of the adjacent larger sprocket. However, after each shift, it is necessary to draw the derailleur mechanism back into a position of alignment. Moreover, initial overshooting must be relaxed as soon as the chain has commenced to shift. It will therefore be appreciated that some skill and constant attention on the part of the operator during the entire course of the shift must be exercised.

SUMMARY OF THE INVENTION

It is therefore an object of the present invention to overcome the aforementioned disadvantages present in the prior art by providing an improved bicycle control mechanism which is selectively and positively upshifted or downshifted to change the gear ratios of a bicycle gear-change transmission with relatively effortless movement of a control lever mounted in a location convenient to the rider.

It is another object of the present invention to provide a control mechanism of the character last noted wherein simple unidirectional movements of a lever are all that is necessary to upshift or downshift gears without the necessity of sacrificing bicycle control.

It is another object of the present invention to provide a bicycle control mechanism of the aforenoted type which by its particular construction minimizes any tendency of the mechanism to disengage thereby permitting unwanted downshifts of such mechanism.

It is another object of the present invention to provide a gear-change control mechanism of the character last noted which prevents unwanted shifts in gear ratios caused by unintended forces acting on the cable.

It is another object of the present invention to provide a bicycle control mechanism which overcomes bicycle sprocket chain reluctance and insures proper positioning of the bicycle sprocket chain by a chain-derailleur mechanism as the sprocket chain is moved from a smaller diameter sprocket gear to a larger diameter sprocket gear.

It is another object of the present invention to provide a bicycle control mechanism in which an indication is given to an operator, so as he may distinguish between a downshift operation and an upshift operation.

It is another object of the present invention to provide a bicycle control mechanism of the aforenoted type in which the components are properly positioned to greatly reduce impact loads thereon so as to avoid a tendency of such impact loads to disengage the control mechanism.

It is another object of the present invention to provide a bicycle control mechanism of the last noted category which may be easily adaptable to gear-change transmissions having any number of speed ratios without increasing the size of the mechanism.

It is another object of the present invention to provide a bicycle control mechanism which may be conveniently located on practically any portion of a bicycle.

It is another object of the present invention to provide a control mechanism which significantly diminishes the adverse affects of cable stretch and friction losses on accurate displacement of the chain-derailleur mechanism.

It is another object of the present invention to provide a control mechanism of the aforenoted type which is adaptable to accommodate either larger or smaller spacing between gear positions in the bicycle transmission.

It is another object of the present invention to provide a control mechanism of the aforenoted character which accommodates varying spacing between gear positions which may result from a linkage having varying leverage ratios in a derailleur mechanism.

In order to carry out the aforementioned objects, the present invention contemplates provision of a novel and improved type of control mechanism which operates in conjunction with a gear-change transmission for a bicycle. The control mechanism incrementally and positively controls the displacement of a biased member associated with a bicycle gear-change transmission between a plurality of predetermined positions for effectuating changes in gear ratios of the transmission in response to unidirectional movement of an operator control lever for the control mechanism.

In a preferred embodiment, the control mechanism is adapted for use in incrementally winding and unwinding the normally tensioned cable of the bicycle gear-change transmission as it moves between a plurality of set positions. Movement from one position to another results in the changing of the gear ratio in the gear-change transmission. Such an unwinding and winding action is in response to the unilateral movement of an operator control lever moving to an upshift position and a downshift position, respectively.

In this particular embodiment, the control mechanism includes a support housing which is suitably mounted as a unit on any convenient portion of the bicycle. Rotatably supported by the housing for movement in either of two directions of rotation is at least one ratchet wheel. The cable is appropriately connected to the ratchet wheel and urges it in one direction of rotation so as to be movable in unison therewith. A spring biased, manually operated control lever is connected to the housing for movement in either of the two directions of rotation. Normally, the operator control lever is maintained and returnable to a rest position. Operatively associated with the ratchet wheel is a biased stop pawl which is pivotally connected to the housing for selectively preventing rotation of the ratchet wheel in the one direction of rotation. In addition, a biased release pawl is connected to and conjointly movable with the operator control lever. The release pawl in response to movement of the operator control lever in the opposite direction of rotation is operable to disengage the stop pawl from the ratchet wheel. Accordingly, the ratchet wheel is free to operate in the one direction in response to the urging of the tensioned cable to thereby effect a change in gear ratio in the transmission.

To perform a downshift, the lever is sufficiently moved so as to effect movement of the stop pawl out of engagement with the ratchet wheel. During this movement, an advance pawl carried by the operator control lever is brought toward close proximity to a tooth of the ratchet wheel. By virtue of the momentum of the ratchet wheel moving in the one direction, it will contact the advance pawl and in doing so give rise to an audible signal and an impulse which is felt by the operator. Such contact signifies that a downshift will then be accomplished by release of the operator control lever, which will permit it to return to the rest position and the stop pawl to reengage the ratchet wheel so as to prohibit further rotation thereof.

To perform an upshift operation, the advance pawl in response to movement of the operator control lever beyond the impulse position, engages the ratchet wheel for driving it in the opposite direction of rotation. When the new position is reached, the stop pawl, which had been disengaged by action of the release pawl, reengages the ratchet wheel to prevent backward movement. A pin connected to the housing is so arranged as to disengage the advance pawl as the operator control lever returns to the rest position after the lever is released. Simultaneously, the release pawl resiliently bypasses the stop pawl to return to its initial position.

To overcome the aforedescribed bicycle chain reluctance which may be encountered in a derailleur mechanism during a shift in gear ratios, the aforenoted control mechanism provides an improved overshift arrangement. The term overshift as used through the specification and claims refers to the condition wherein the chain is forced to overshoot the intended position for a particular bicycle gear as the chain moves from the gear having one diameter to an adjacent gear having a larger diameter. Overshifting the chain by a certain distance past its intended position during the shifting process ensures change of sprocket position by the chain. The control mechanism of the present invention provides for the overshift by enabling the operator control lever to be moved a predetermined distance beyond the desired position required to effect an actual upshift until it contacts a surface of the housing. The predetermined distance the operator lever travels corresponds to the amount the sprocket chain will laterally travel past the desired sprocket gear. The chain returns to the desired aligned position in response to release of the lever.

The control mechanism can be adapted to a gear-change transmission having different gear spacings by correspondingly changing the diameter of the cable drum. The present invention also accommodates for varying spacing between gear positions by use of a cable drum having an eccentric type configuration.

In order to minimize the effects of cable stretch and cable friction losses, the control mechanism of one embodiment is uniquely mounted on and directly connected to a chain-derailleur type transmission. Such an arrangement operates in a similar fashion to the other embodiments except that the ratchet wheel is biased in one direction of rotation by a positive drive arm connected to the derailleur mechanism as opposed to being biased by the cable. Also, the operator control lever which carries the release pawl and advance pawl is actuated by a cable instead of by direct manual manipulation. The cable, in turn, is connected to a lever mounted on the handlebar or other appropriate position.

In a further embodiment, permitting adaptation to existing bicycles having existing derailleurs of varying design, the control mechanism is mounted on the frame of the bicycle, the ratchet wheel being biased by a cable, and the operator control lever being actuated by a cable connected to a lever mounted on the handlebar or other appropriate position.

These and other objects, features, and advantages of the present invention will become readily apparent after a reading of a detailed description of the preferred embodiment when viewed in conjunction with the accompanying drawings wherein like reference numerals indicate like structure throughout the several views.

BRIEF DESCRIPTION OF THE DRAWINGS

FIG. 1 is a side elevational view, partly in section, showing the control mechanism in a rest position and made in accordance with the principles of the present invention mounted on a handlebar and connected to a conventional chain-derailleur mechanism;

FIG. 2 is a plan view of the control mechanism shown in FIG. 1 with the addition of a cover;

FIG. 3 is a side elevational view of the control mechanism similar to FIG. 1 but showing it in one position of operation during a downshift operation;

FIG. 3A is a somewhat enlarged partial side elevational view similar to FIG. 3 showing the components of the control mechanism in a different position during a downshift operation;

FIG. 4 is a side elevational view showing the control mechanism in a different operative position upon completion of a downshift operation;

FIG. 5 is a side elevational view showing the control mechanism in one operative position of operation during an upshift operation;

FIG. 9 discloses an alternate embodiment of the present invention made in accordance with the principles of the present invention being directly mounted on and connected to a chain-derailleur mechanism of the type illustrated in FIG. 1;

FIGS. 10 to 12 are directed to views similar to that of FIG. 10 but illustrating the control mechanism in respective different positions of operation.

DESCRIPTION OF A PREFERRED EMBODIMENT

Figure 6:
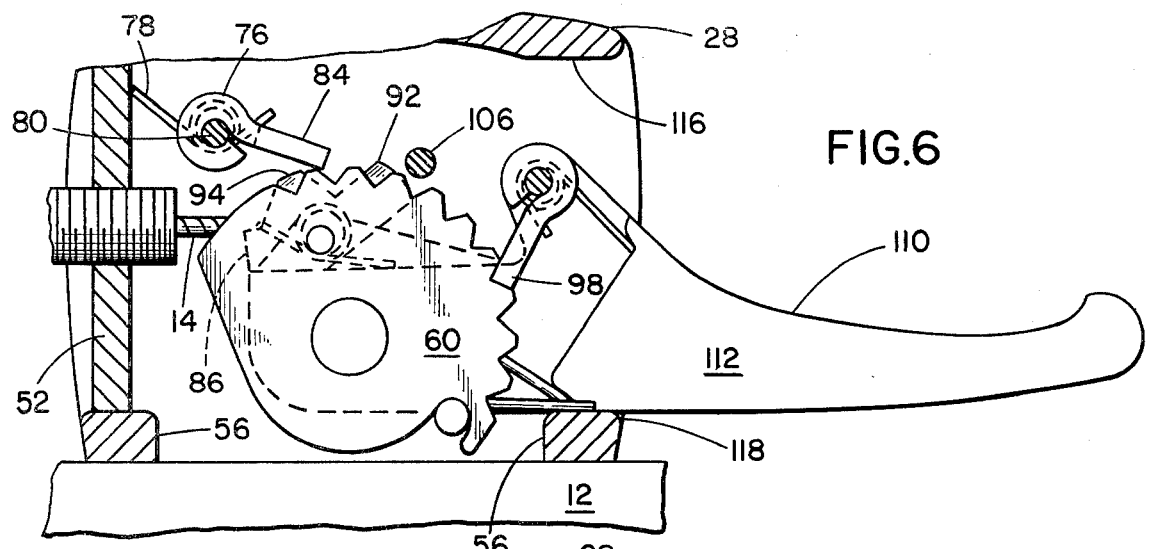
FIG. 6 is a view similar to FIG. 5 but showing the control mechanism in another operative position during an upshift operation.

Referring now to the figures of the drawing, and in particular to FIG. 1, there is disclosed a preferred embodiment of a bicycle control mechanism of the present invention being generally designated by reference numeral 10. Although the bicycle control mechanism 10 may be suitably connected on any appropriate portion of a bicycle, as will be more fully set forth below, the embodiment of FIG. 1 is shown as mounted on a bicycle handlebar 12 for enabling quick and easy access for the hand of a bicycle rider. A tensioned and flexible Bowden type cable 14 is situated so as to interconnect the control mechanism 10, with any typical chain-derailleur parallelogram type bicycle gear-change transmission mechanism 16, one known type of which is manufactured and commercially available from Maeda Industries, Ltd., Osaka, Japan. This type of derailleur mechanism is conventionally fixedly mounted to the hub 18 of the bicycle by bracket 20 in a known manner, as is shown in FIG. 1. The derailleur sprocket wheels 22 are conventionally connected to the bicycle sprocket chain 24 and are movable toward and away from the coaxially arranged gear sprockets, generally designated by reference numeral 26, which are mounted on the bicycle hub 18 in conventional fashion. In this manner, to change the gear ratio for the bicycle one controls the displacement of the derailleur mechanism 16 such that the sprocket wheels 22 which carry the chain 24 will move the chain to respective ones of the gear sprockets 26. Hence, changing gear ratios is rather easily accomplished. The chain-derailleur mechanism 16 is operable in response to controlled displacement of the flexible and tensioned cable 14 between a plurality of properly aligned positions so as to effect a change in gear ratio for the bicycle. The cable 14 is tensioned by reason of it being suitable connected to the derailleur transmission mechanism 16. While a chain-derailleur type mechanism 16 is described for use in conjunction with the present invention, it should be understood, of course, that other gear-change mechanisms may be used in association with the present invention which operate on the principle of sliding gears, or moving elements which comprise sprockets, or gears and in which a change of gear ratio is achieved through a controlled displacement of a flexible and tensioned cable.

As perhaps best illustrated in FIG. 1 taken in conjunction with FIGS. 2 and 3, the improved bicycle control mechanism 10 is shown as including, in essential respects, a support housing 28, rotatable means 30, biased stop means 32, release means 34, advance means 36, manually actuated operator control means 38, disengagement means 40, and overshift means 42.

Referring to FIG. 2 the support housing 28 is comprised of two similarly configured housing sections 44, releasably secured together by a conventional bolt 46 and nut 48 arrangement. Both housing sections 44 are generally spaced apart and in parallel relationship with each other when in the assembled condition. In addition, each section 44 has a generally arcuate shaped recess segment 50 which suitably receives a portion of the handlebar 12. The support housing sections 44 whenever in the assembled condition are thus adapted to be firmly mounted as a unit on the handlebar 12. The housing sections 44 may be fabricated from any suitable material and, preferably, one which will withstand repeated use without failure and fracture as well as various types of environmental conditions without impairing operation of the control mechanism 10.

An adjuster nut plate 52 is secured by and between grooves 54 formed in the top portion of the housing sections 44 and rests upon side projections 56 thereof. The adjuster nut plate 52 has a threaded opening through which a cable adjuster 58 for the flexible type cable 14 is threadedly affixed. Such cable adjuster 58 is of conventional construction and operates in a rather well known manner to permit lateral alignment of the positions of the derailleur mechanism 16 with the location of the sprockets 26.

The rotatable means 30 of the preferred embodiment of the present invention is basically comprised of a pair of spaced apart ratchet wheels 60 and a cable drum 62 connected therebetween. Both ratchet wheels 60 and cable drum 62 are rotatably supported on the bolt 46 which defines the main pivot shaft 64 for the control mechanism 10. Each ratchet wheel 60 has formed at the periphery thereof a plurality of serially arranged notches which define teeth 66 each having respective tooth surfaces 68.

It is within the scope and spirit of the present invention that the control mechanism 10 be versatile so that it may be readily adapted to existing types of gear-change transmission which may have different numbers of gear positions. To this end, it is contemplated that the number of teeth 66 on the ratchet wheels 60 be correspondingly changed so as to provide for the correct number of positions between the limit stops 67, 67a formed on the ratchet wheel. If the gear-change transmission contains its own limit stops, no such limit stops on the ratchet wheel are required. As will be subsequently made more apparent, since all the components except the ratchet wheels 60 return to a rest position following each shift, the largest practical number of gear positions is limited only by the number of teeth 66 which may be formed on the useful perimeter of the ratchet wheels. Ratchet wheel slots 70 are also formed adjacent the periphery of the ratchet wheels 60 and serve to snugly and tightly receive therein an anchor pin 72 or the like. Suitable secured to the anchor pin 72 in a conventional fashion, is one end of the cable 14 which, as aforenoted, is tensioned by reason of it being connected to the chain-derailleur mechanism 16. As a result of such tensioning the ratchet wheels 60 and cable drum 62 are urged to rotate in the counterclockwise direction, as indicated by arrow A.

Figure 8:
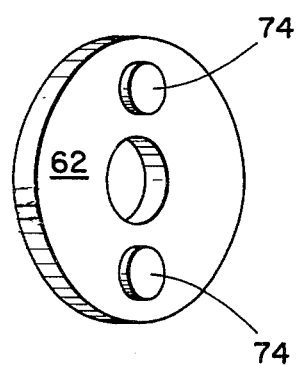
FIGS. 8 and 8A, respectively, show different cable drums adapted for use in the control mechanism of the present invention.
Figure 8A:
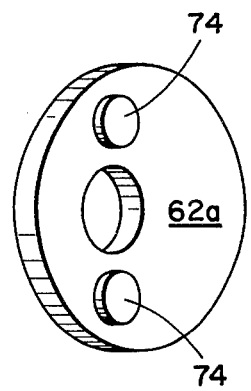

As more clearly shown in FIG. 8, the cable drum 62 of the preferred embodiment is shown as having preferably, at least two punched bosses 74, each formed on opposite sides thereof. These bosses 74 are designed to respectively fit within suitable openings (not shown) in the ratchet wheels 60. Although punched bosses 74 have been disclosed for use in the present invention, it should be mentioned, of course, that other well known types of connecting devices may be suitably used. Furthermore, while cable drum 62 is shown in FIG. 8 with a generally circular configuration, the present invention contemplates that such cable drum be formed with an eccentric profile such as shown in FIG. 8A. It has been determined that if the cable drum 62a has an eccentric configuration then it is possible to accommodate for derailleur type mechanisms which provide for varying spacing from one gear to the next which may result from a linkage with varying leverage ratios in a derailleur mechanism. The purpose served by the eccentricity is that it causes the effective cable drum radius to change as the cable drum 62a is rotated. Therefore, the incremental distance the cable 14 moves into or out from the control mechanism correspondingly changes with such radius change.

Moreover, the present invention envisions that if it is desired to adapt the control mechanism 10 to a different gear-change transmission having different spacings between gear positions, then all that is required to be done is to replace the cable drum 62 with one having a correspondingly larger or smaller diameter to accommodate for such changes.

With reference to FIG. 3 the biased stop means 32 of the present invention is comprised of a latch or stop pawl 76, stop pawl torsion spring 78, and a pivot shaft 80. The pivot shaft 80 is fixedly secured at opposite ends to respective bores 82 formed in the housing sections 44 (FIG. 2). The stop pawl 76 is pivotally supported by pivot shaft 80 and has a leg portion 84 which is adapted to selectively engage respective ones of the teeth 66. Torsion spring 78 is arranged so that one leg thereof contacts the adjuster nut plate 52 and the opposite leg contacts the leg portion 84 of the stop pawl 76. By this arrangement the stop pawl 76 is normally selectively urged into full engagement with respective ones of the teeth 66. In such a manner, the stop pawl 76 is effective to positively prevent rotation of the rotatable means 30.

With continued reference to FIGS. 2 and 3, the release means 34 of the preferred embodiment of the present invention is comprised of a release pawl 86 pivotally mounted on release pawl pivot 88 which is carried adjacent one end of the operator control means 38 so as to be movable in unison therewith. The release pawl 86 is operatively connected to a release pawl torsion spring 90 having one end abutting a surface of the release pawl 86 and an opposite end engaging an abutment surface located on the operator control means 38. In this arrangement the release pawl 86 tends to pivot in a clockwise direction indicated by arrow B. Also, as shown depicted in FIG. 3, the release pawl 86 has a contact end surface 92 which is situated so as to contact the stop pawl 76, and an intermediate stop surface 94, the purpose of which is to be disclosed in the succeeding description of the preferred embodiment.

Referring now to the advance means 36 as more particularly illustrated in FIGS. 2 and 3, it will be seen to be comprised of an advance pawl pivot pin 96, a pivotally mounted advance pawl 98 and an advance pawl torsion spring 100. The advance pawl pivot pin 96 is formed from a projection which is suitably connected to the operator control means 38 and as such is movable conjointly therewith. Advance pawl 98 is supported by the advance pawl pivot pin 96 and has a leg portion 102 with a contact end 104, and lower surface 103. The advance pawl 98 is adapted for pivotal movement so that the contact end 104 is movable into and out of engagement with the teeth 66 of the ratchet wheel 60. Advance pawl torsion spring 100 has one end contacting an abutment surface suitably formed on the operator control means 38 and the opposite end engaging the leg portion 102. Such arrangement causes the leg portion 102 to move into the path of the teeth 66 whenever the operator control means 38 is appropriately advanced.

The disengaging means 40 of the instant embodiment is defined by an advance pawl disengagement pin 106. This pin is connected to one of the housing sections 44 and serves to effect disengagement of the advance pawl 98 whenever the operator control means 38 returns to its rest position, indicated in FIG. 1.

In order to prevent any tendency of the advance pawl 98 and stop pawl 76 to disengage by themselves to thereby result in unwanted downshifts of the control mechanism 10 such that the cable 14 moves from the support housing 28, pawls 76 and 98 are located in a special relationship relative to each other and the teeth 66 located on the periphery of the ratchet wheels 60. The pivot pins 96 and 80 for the advance pawl 98 and stop pawls 76, respectively, are so positioned that end pressure or forces acting on the pawls whenever contacting a particular tooth surface 68 effectively act through the centers of such pivot pins 80 and 96 and produce no torque tending to cause the pawls 76 and 96 to move into or out of engagement. With this type of arrangement impact forces on the pawl ends will not tend to bounce the pawls outward; yet the ratchet wheels 60 are not forced to move clockwise to permit stop pawl 76 to disengage. Clockwise movement would be necessitated by a pawl end geometry in which end force on the pawl tends to force the pawl further into engagement with a tooth of wheels 60. Such wheel movement is undesirable because it would cause increased wear on teeth 66, resulting from increased pressure between tooth and pawl end caused by friction in cable 14 opposing clockwise motion of ratchet wheel 60.

Additionally, the location of the advance pawl 96 is positioned with respect to the teeth 66 so as to enable the contact end 104 of the leg portion 102 to come into close proximity with a particular tooth surface 68 such that a small gap identified by reference character $d$ separates the end 104 and tooth 66. The significance of such relationship, as will be presently more particularly described, is to enable an operator of the bicycle to distinguish between an upshift and a downshift. In addition, the present invention envisions within its scope the elimination of any tendency for the control mechanism 10 to oscillate whenever the operator control means 38 is actuated to effect a downshift. To this end, the instant invention has both the advance pawls 96 and stop pawls 76 so positioned, as aforedescribed to prevent unwanted downshifts and in addition, contemplates positioning the disengagement pin 106 and surface 103 of pawl 98 so that the counterclockwise torque exerted on operator control means 38 by the teeth 66 of ratchet wheel 60 acting through pawl 98, is just counterbalanced by clockwise torque exerted by pin 106 on surface 103 of pawl 98 during the process of disengagement. This counterbalancing prevents a sudden change of net counterclockwise torque on operator control means 38 at the instant of disengagements which would result in undesirable sudden movement of means 38, which is supported by the operator's "resilient" finger. This sudden movement could result in an unwanted additional shift if not prevented as described above. The particular relationship of the disengagement pin 106, as shown, is such that it is radially arranged between the ratchet teeth 66, and advance pawl pivot 96, achieving the desired counterbalance of torques. The counterbalance need not be exact, as a wide tolerance is permissible depending on the length of means 38, friction in means 38 and bias force in cable 14.

To insure that the advance pawl 98 engages the proper tooth, e.g. tooth 66$a$ rather than tooth 66$b$ of the ratchet wheel 60 at the beginning of a shift cycle, it is necessary to arrange the location of the stop pawl 76 such that whenever on a downshift when the advance pawl 98 is just forced by disengagement pin 106 to disengage from the ratchet wheel 60, a small gap $e$ (FIG. 4) exists between the contact end of the stop pawl 76, and the particular tooth 66 of the ratchet wheel 60 it will soon contact. Accordingly, upon the next shift advance pawl 98 will not enter notch $b$ as opposed to notch a. It should be emphasized, of course, that the impact resulting from this gap as well as aforenoted gap d separating the contact end 104 and advance pawl (FIG. 3) can be made arbitrarily small with no adverse affect on the operation of the control mechanism 10. However, for effective operation of the control mechanism relatively small gaps should be provided.

The operator control means 38 of the present invention is adapted to execute either a downshift or an upshift of the chain-derailleur mechanism 16 by a unidirectional movement thereof. Such unidirectional movement, as aforementioned, facilitates a more convenient shifting for the rider. Thus, instead of an operator having to move a hand to the backside of the control mechanism to effect a shift as would normally be the case with a bidirectional lever, an operator merely has to move such operator control means 38 in one direction. In the preferred embodiment, the operator control means 38 includes an operator control lever 110 and a main torsion spring 108. The operator control lever 110 includes elongated handle portion 112 and a main body portion 114. The handle 112 extends from the support housing by a distance sufficient to permit an operator's hand or fingers to easily commence a shifting operation. Main body portion 114 has formed therein an opening (not shown) such that the operator control lever 110 is supported by the main pivot shaft 64 for pivotal movement in either direction. Torsion spring 108 is wrapped on main pivot shaft 64 and has one end contacting a side projection 56 for a housing section 44 and the opposite end contacting the lever 110. Such arrangement urges the operator control lever 110 in the counterclockwise direction until it contacts a stop surface 116 formed on housing section 44. Whenever lever 110 is in the position whereat it engages stop surface 116, such as depicted in FIG. 1, it is in a rest position. In this particular position, the control mechanism 10 is in a neutral or inoperative condition.

As will be explained in greater detail in the succeeding description of the mode of operation for the present invention, to effect either a downshift or upshift, the operator control lever 110 is manipulated so that it is moved in the clockwise direction through either a partial or a complete stroke, respectively.

The overshift means 42 of the present invention is defined by an abutment surface 118 connected to the support housing 28, This abutment surface 118 is located with respect to the bottom side of the housing section 44 such that the operator control lever 110 will pull the cable 14 inwardly toward the housing 28, by a distance sufficient to have bicycle sprocket chain 24 of the chain-derailleur mechanism 16 overshoot the desired position for the intended gear. To this end, the operator control lever 110 travels downwardly farther than what is actually required to effectuate an upshift. By having the chain 24 overshoot an intended gear 26 by a certain distance, chain reluctance, which is normally present whenever the chain moves from one gear to an adjacent gear having a larger diameter will be overcome and the upshift completed.

In the present embodiment, the abutment surface 118 is defined by one of the side projections 56. However, it is within the theory and practice of the present invention that other structure may define such abutment surface. Furthermore, it is within the scope of the present invention that such abutment surface 118 be vertically adjustable so as to appropriately adjust the overshift distance. It has been determined that a satisfactory overshift will result if operator control lever travels farther downward by a distance such that there is a 1⅔tooth overshift for customary derailleur designs and cable lengths. In the present embodiment, this would amount to about 25° assuming 15° spacing between adjacent teeth 66. The above example has been given for purposes of illustration and is not to be construed as a limitation of the present invention.

After having described the aforenoted constructional arrangement of a preferred embodiment of the present invention, its mode of operation will be presently described in performing a downshift and an upshift.

The sequence of operation performed by the control mechanism 10 in effecting a downshift will be more clearly understood by reference to FIGS. 1 to 4. As earlier mentioned, a downshift occurs whenever the operator control lever 110 is moved a predetermined portion of its entire downward stroke and released. The cable 14 which is wound upon the drum 62 is then allowed to exit the control mechanism 10.

FIG. 3 shows the operator control lever 110 positioned in the downshift position. As indicated in FIG. 3 the release pawl 86 has moved the stop pawl 76 from engagement with one of the tooth surfaces 68. Accordingly, the rotatable means 30 including ratchet wheels 60 and drum 62 is movable in a counterclockwise direction in response to the tension applied by the cable 14. In the particular position depicted, it will be noted that the contact end 104 of the leg portion 102 of advance pawl 98 is spaced in close proximity from tooth surface by gap d. As aforementioned, such a gap distance will close in response to the momentum of the now freely moving rotatable means 30. When one of the tooth surfaces 68 contacts the advance pawl 98 (see FIG. 3A), the resulting impulse will be transmitted to the operator control lever 110 which will in turn be felt by the operator. Additionally, such impact will occasion an audible signal. Consequently, signals are provided to indicate that the downshift operation will be completed by release of the lever. Also, such signals, as will be afterwards made more clear, serve to distinguish a downshift from an upshift.

Release of the operator control lever 110 will permit it to return to the rest position (FIG. 1) against stop 116 in response to the biasing force of main torsion spring 108. As the operator control does so return, the advance pawl 98 allows rotatable means 30 to rotate counter clockwise. Hence, the cable 14 is allowed to exit from the support housing 28 by a certain distance and in so doing actuates the chain-derailleur mechanism 16 in well known fashion to shift the gear ratios for the bicycle. Simultaneously, the release pawl 86 carried by the operator control lever will no longer contact the stop pawl 76. Therefore, stop pawl 76, under the bias of stop pawl torsion spring 78 once again reengages another tooth surface 68 so as to positively restrain further rotation of the ratchet wheels 66 (See FIG. 4). Also disengagement pin 106 serves to disengage the advance pawl 98 from the ratchet teeth 66. It will be appreciated, of course, that a downshift operation is accomplished in a simple and reliable manner.

Reference is made to FIGS. 1, 2 and 5 to 7 so as to more clearly understand the sequence of operations necessary to effect an upshift. An upshift occurs whenever the cable 14 is pulled into the housing 28 by a predetermined distance sufficient to effectuate a change in gear ratio in the derailleur mechanism 16. As clearly shown in FIG. 5, the operator control lever 110 has been pulled downwardly to a position past that defining the downshift position. In such position, the advance pawl 98 has drivingly engaged the tooth surface 68 of tooth 66a thereby rotating the ratchet wheels 60 in the clockwise direction. Also, as noted, the release pawl 86 has traveled a distance whereby its end surface 92 no longer contacts the stop pawl 76.

FIG. 6 shows the operator lever 110 in the full stroke position whereby as aforedescribed, an overshift is accomplished. Stop pawl 76 is shown contacting a surface 94 of the release pawl 86. As will be discussed in connection with the overshift operation, the surface 94 prevents the stop pawl 76 from engaging a non-intended tooth of ratchet wheel 60, when the ratchet wheel 60 is overshifted more than one tooth. Whenever the ratchet wheel stop limit surface 67 contacts the handlebar 12 or, in another construction, other surface fixed to support housing 28, the limit for the number of downshifts or upshifts of the control mechanism 10 has been reached. Consequently, no further downshifts or upshifts will be accomplished. Preferably, the number of upshifts or downshifts will correspond to the number permissible by the derailleur mechanism 16. As noted, since only the ratchet wheels 60 are effectively moved, the number of shift positions is only limited by the useful perimeter of the ratchet wheels 60 and the number of incremental positions which are desired for a particular gear-change transmission.

As shown in FIG. 6 the operator control lever 110 has contacted abutment surface 118 and has accomplished the overshift of the sprocket chain 24 by moving the ratchet wheels and therefore the cable 14 in a counterclockwise direction past the point actually required for an incremental upshift. As mentioned, such cable overshift distance which exceeds that necessary for moving cable 14 the appropriate distance to complete an upshift may be a distance in the order of 1⅔ tooth. Since this relatively large overtravel distance of the cable 14 and ratchet wheels 60 may cause the sprocket chain 24 to be retained at an undesired position because the stop pawl 76 engages a non-intended tooth upon release of lever 110, the intermediate surface 94, as noted, on the release pawl 86 is designed to engage stop pawl 76 to thereby prevent stop pawl 76 from engaging a non-intended tooth upon such lever release. In such a manner, the sprocket chain will fall back into the desired gear whenever the operator control lever is released.

Figure 7:
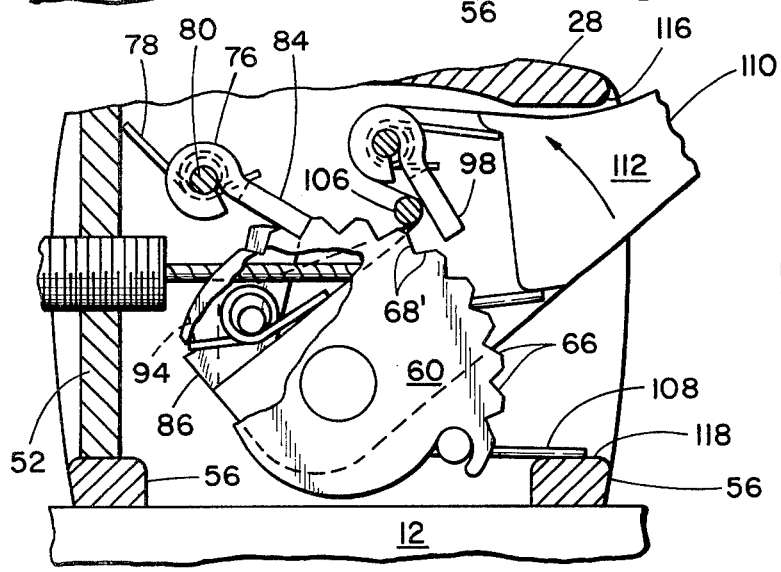
FIG. 7 is a view similar to FIGS. 5 and 6 but showing the control mechanism in a still further operative position during an upshift operation.

FIG. 7 shows the operator control lever 110 at a position during its return stroke to stop surface 116. In this position, the disengagement pin 106 serves to disengage the advance pawl 98 from the particular tooth 66 it was in contact with. The stop pawl 76 has again engaged with ratchet teeth 66 to preclude further counterclockwise rotation of the rotatable means 30 and release pawl 86 is shown pivoting over the stop pawl 76 so as to enable pawl 86 to resume the position normally assumed during the rest position (FIG. 1) of the control mechanism 10. It will be understood that the rest position of the mechanism after the above described upshift operation, will be similar to that of FIG. 1 with the exception that the ratchet wheels 60 will be appropriately incrementally advanced.

In the general organization of components as above described the control mechanism can through unidirectional movements of a lever, change gear ratios in a simple and reliable manner.

Referring to another embodiment of the invention illustrated in FIGS. 9 through 12, parts corresponding to those of the previous embodiment have been designated by similar reference numerals with the addition of an added prime marking. In this particular embodiment, the control mechanism 10'' is adapted to be directly mounted on and connected to the derailleur mechanism 16''. It should be emphasized that while the control mechanism will be described as being suitably adapted to the type of chain-derailleur mechanism previously described, such control mechanism may be used in conjunction with similar types of chain-derailleur mechanisms without departing from the present invention. Such embodiment tends to compensate for the effects of cable stretch.

As perhaps best illustrated in FIG. 9 taken in conjunction with FIG. 10 the bicycle control mechanism 10'' similarly includes, in essential respects, a support housing 28'', rotatable means 30'', biased stop means 32'', release means 34'', advance means 36'', manually actuated operator control means 38'', disengagement means 40'', and overshift means 42''.

With reference to FIGS. 1, 9 and 10 the support housing 28'' is preferably comprised of a single member with a generally S-shaped configuration (FIG. 11) having derailleur receiving portion 122 and a control mechanism receiving portion 124. The derailleur receiving portion 122 is arranged so as to detachably receive therein the fixed pivot housing portion 126 of any suitable derailleur mechanism 16''. This pivot housing portion 126 is connected to the bracket 20 which is affixed to the hub 18 as is shown in FIG. 1. A position adjustment screw 127 threadedly received by the support housing 28'' is adapted to contact fixed pivot housing portion 126 for providing assistance in positioning the control mechanism 10'' relative to the derailleur mechanism 16''. The position adjustment screw 127 permits lateral alignment of the positions of the derailleur mechanism 16'' with the location of the sprockets 26 by causing the housing 28'' to rotate about pin 64'', thus rotating arm 128 about pin 64'' and moving the cage 130 laterally to effect the alignment.

The control mechanism receiving portion 124 extends generally parallel to the movable parallelogram link main body portions 128 which are pivotally interconnected between the movable pivot housing portion 130 and fixed pivot housing portion 126. Movable housing portion 130 is normally biassed by the derailleur mechanism 16'' itself such that it moves towards the right as viewed in FIG. 10. It will be appreciated, of course, that the movable pivot housing portion 130 carries and supports the sprocket wheels 22 (FIG. 1) which mount the bicycle chain 24. Controlled movement of movable pivot housing portion 130 will be thus effective to concomitantly transport the chain 24 to the desired respective one of the gear sprockets 26 for the purpose of changing the gear ratio of the bicycle transmission.

The rotatable means 30'' of the instant embodiment is basically comprised of a single ratchet wheel 60'' which is rotatably supported on pin 132 by a bearing 134. The pin 132 defines the main pivot shaft 64'' for the control mechanism 10''. Ratchet wheel 60'' has formed at the periphery thereof a plurality of serially arranged teeth 66'' having respective tooth step surfaces 68''. Suitably secured to the ratchet wheel 60'' is an arm drive pin 136. The arm drive pin 136 is also connected to one of the pivotal main body portions 128 of the derailleur mechanism 16'' and extends through a generally arcuate slot 138 (FIG. 10) formed in the support housing 28'' which defines the stop limits for ratchet wheel 60''. Since arm drive pin 136 is connected to one of the pivotal main body portions 128 it will normally be forced rightwardly, as viewed in the drawing, by reason of the bias afforded by the derailleur mechanism 16''. Hence, ratchet wheel 60'' is also rightwardly biased so as it has a tendency to rotate in the counterclockwise direction.

The operator control means 38'' of the present invention is adapted to execute either a downshift or an upshift of the derailleur mechanism 16'' by a unidirectional movement thereof. Such unidirectional movement, as aforementioned, facilitates a more convenient shifting. In the present embodiment, the operator control means 38'' includes operator control lever 110'' and main torsion spring 108''. The operator control lever 110'' is supported by the main pivot shaft 64'' for pivotal movement in either direction and torsion spring 108'' is wrapped on main pivot shaft 64'' and has one end contacting a portion of the support housing 28'' and the opposite end contacting a conventional cable clamp 140 connected to the lever. In such arrangement the operator control lever 110'' is urged in the counterclockwise direction. The Bowden cable 14'' in this particular embodiment is at one end directly connected to the operator control lever 110'' by cable clamp 140 instead of being wrapped about a cable drum as in the previous constructions. The opposite end of the cable (not shown), as noted, is appropriately connected to any conventional and suitable hand operated control lever (not shown) which is capable of moving the cable in direct response to actuation of such lever. In normal usage, the cable 14'' whenever actuated by such hand operated control lever pulls upwardly the operator control lever 110'' against the bias of lever spring 108'' thereby rotating the control lever 110'' in the clockwise direction.

The biassed stop means 32'' of the present embodiment includes stop pawl 76'', stop pawl torsion spring 78'', and pivot shaft 80''. The pivot shaft 80'' is fixedly secured at opposite ends to the control mechanism housing receiving portion 124. Stop pawl 76'' is pivotally supported by pivot shaft 80'' and has leg portion 84''. Torsion spring 78'' is arranged so that its leg contacts the support housing 28'' and the opposite leg contacts the leg portion 84''. By this arrangement stop pawl 76'' is selectively urged into full engagement with respective ones of the teeth 66''. In such a manner, the stop pawl 76'' is effective to prevent rotation of the ratchet wheel 60'' in the counterclockwise direction and thereby movement of the main body portions 128.

With continued reference to FIGS. 9 and 10, the release means 34''', as in the previous embodiments, is comprised of a release pawl 86'' pivotally mounted on release pawl pivot pin 88'' carried by the operator control means 38''. Release pawl torsion spring 90'' tends to pivot release pawl 86'' in a clockwise direction so that contact end surface 92'' is situated to contact the stop pawl 76'' for the purposes aforenoted in the preceding description of the other embodiments.

The advance means 36'' is illustrated in FIGS. 9 and 10 and the advance pawl pivot 98'' is defined by a projection member which is suitably connected to the operator control means 38'' and as such is movable conjointly therewith. Advance pawl 98'' as aforedescribed is adapted for pivotal movement so that the leg portion 102'' is movable into and out of engagement with the teeth 66''. Advance pawl torsion spring 100'' has one end contacting the leg portion 102'' and another end extending through an opening in the operator control lever 110''. The torsion spring 100'' acts to bias the leg portion 102'' into the path of the teeth 66'' whenever the operator control means 38'' is appropriately advanced.

The disengaging means 40'' of the instant embodiment is defined by an advance pawl disengagement pin 106''. Pin 106'' is connected to both walls of the control mechanism receiving portion 124 and serves to effectuate a disengagement of the advance pawl 98'' whenever the operator control means 38'' returns to its rest position, that is, when surface 150 of control lever 110'' strikes pin 106, indicated in FIG. 10.

The overshift means 42'' of the instant embodiment is an abutment surface 118'' defined by an overtravel adjustment screw 142 connected to the support housing 28''. Abutment surface 118'' is spaced from the lever 110'' by a distance sufficient to have bicycle chain 24 of the derailleur mechanism 16'' overshoot the desired position for the intended gear. Consequently, whenever the operator control lever 110'' will travel upwardly to effectuate an upshift and thereafter contact abutment surface 118'' as aforenoted, the sprocket chain 24 will overshoot the intended gear 26 by a certain distance. Thus, any chain reluctance, which is normally present whenever the chain 24 moves from one gear to an adjacent gear having a larger diameter, is overcome. Hence, as mentioned, shifting of chain position is assured.

The operation of the instant embodiment will be presently described in performing a downshift and an upshift.

Figure 11:
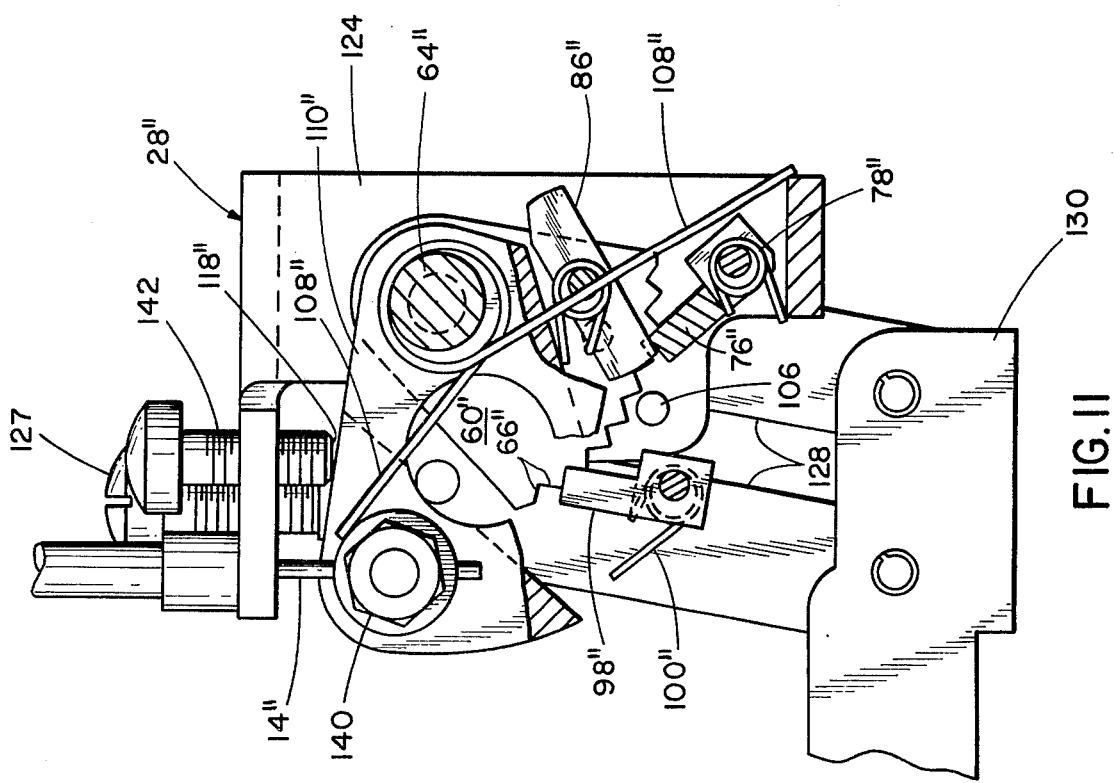

The sequence of operations performed by the control mechanism in effecting an upshift, will be more clearly understood by reference to FIG. 11. To effect an upshift, the control lever (not shown) which may be mounted on the handlebar or other suitable location is appropriately actuated so that cable 14'' is pulled upwardly. Such an action will correspondingly pull the operator control lever 110'' upwardly until it contacts abutment surface 118'' defined by vertical adjustment screw 142. In this manner, the aforedescribed overshift of sprocket chain 24 will be accomplished. Also, as is clear, the advance pawl 98'' drivingly engages an appropriate one of the teeth 66''. As this occurs, the ratchet wheel 60'' is forced to rotate in a clockwise direction. The drive pin 136 which is arranged to interconnect the ratchet wheel 60'' with one of the biased main body portions 128 is correspondingly moved leftwardly with a sufficient force to overcome the bias of the derailleur mechanism 16'' urging such main body portions 128 rightwardly. In such a manner, the movable pivot housing 130 will also move leftwardly relative to the fixed pivot housing 126 to thereby laterally displace the sprocket wheels 20 which carry the sprocket chain 24 to another desired position so as to effectuate a corresponding change in gear ratio.

During such an upshift operation, it should be mentioned and emphasized that the other components of the control mechanism 10'' will operate and function in a similar manner to the last embodiment. Therefore, stop pawl 76'' which had been forced from teeth 66'' by reason of release pawl 86" will in response to release of the lever on the handlebar reengage an appropriate tooth, since spring 108" is again effective to rotate operaator control lever 110" in a counterclockwise direction whereby release pawl 86" no longer obstructs movement of pawl 76" under action of spring 78".

Figure 12:
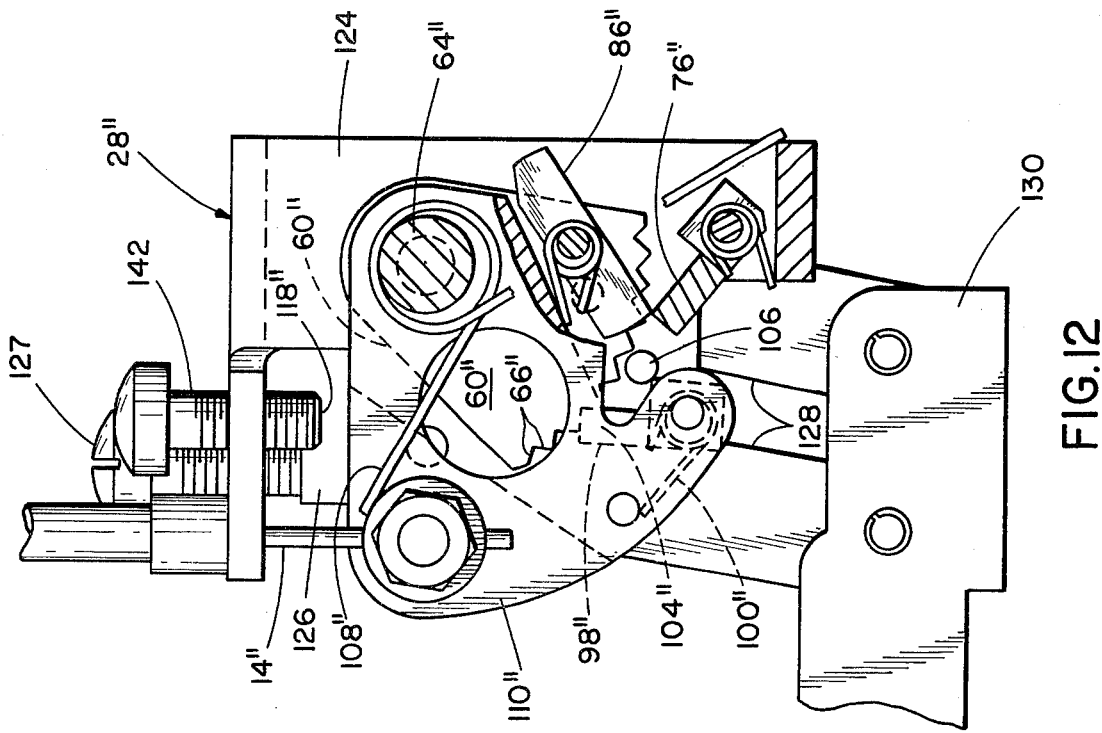

Reference is made to FIG. 12 wherein the downshift operation will be more adequately understood. To effect a downshift, the lever on the handlebar is actuated so as to pull the operator control lever 110" partially toward abutment surface 118". Correspondingly, the release pawl 86" forces stop pawl 76" from engagement with the teeth 66". Thusly, ratchet wheel 60" is free to move. Since the main body portions 128 are normally biased rightwardly they will appropriately urge drive pin 136 and movable pivotal housing 130 rightwardly. Consequently, the sprocket wheels 20 carried by movable pivotal housing also move to thereby effect a downshift operation. Since the ratchet wheel 60" is rotating about bearing 134 it will engage contact end 104" and in doing so impart an impulse to the operator control lever 110" (FIG. 13) thereby signifying to the rider that the downshift will be accomplished by release of the lever 110". As in the previous constructions, whenever lever 110" returns under the influence of spring 108", the disengagement pin 106" will effect disengagement of advance pawl 98" from teeth 66". Also the stop pawl 76" will be effective to reengage with the appropriate tooth 66" to stop continued counterclockwise rotation of the ratchet wheel 60" and thereby further arrest movement of the movable pivot housing 130. Consequently, the sprocket wheels 20 are located at a new position. The constructional arrangement as aforenoted provides for a convenient, simple, and reliable manner of controlling the displacement of a chain derailleur type mechanism for changing gear ratios.

Figure 13:
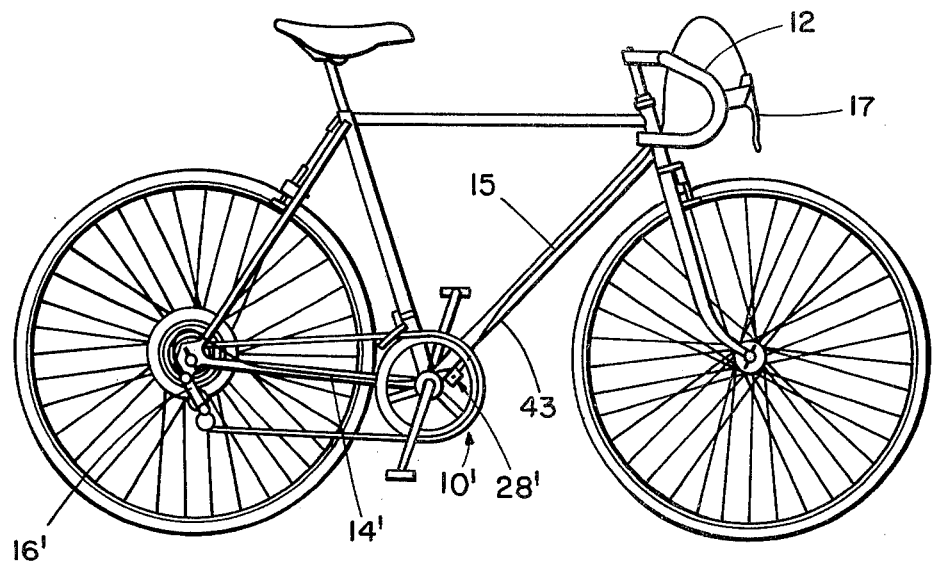
FIGS. 13 and 14 disclose a further alternate embodiment of the present invention made in accordance with the principles of the present invention being mounted to a frame member and connected by cables to a handlebar mounted lever and a conventional chain-derailleur mechanism.
Figure 14:
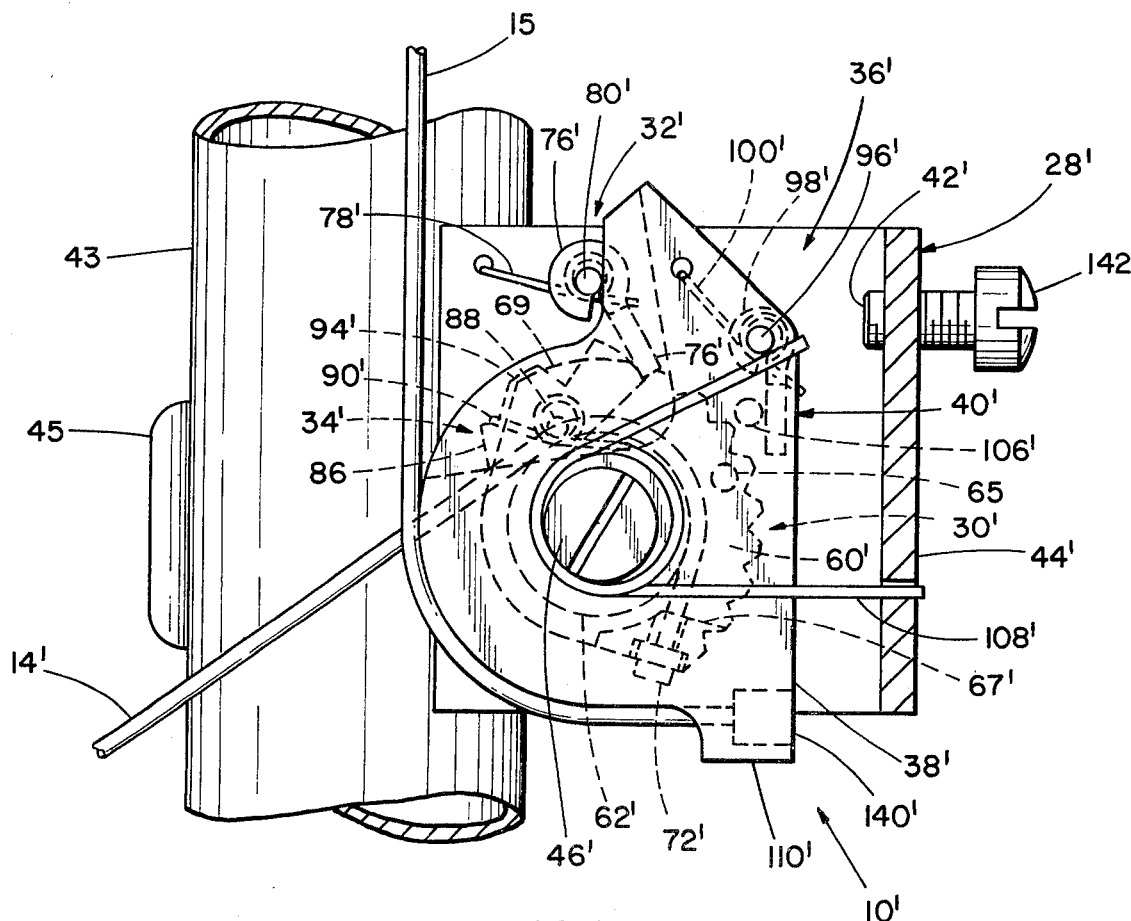

Referring to FIGS. 13 and 14, there is shown a further embodiment of the bicycle control mechanism 10' which is mounted to a frame member 43 of the bicycle and connected by cables 15 and 14' to a handlebar mounted lever 17 and a conventional chain-derailleur mechanism 16'. The control mechanism 10' is generally similar to control mechanism 10 and parts corresponding to those of the previous embodiment have been designated by similar reference numerals with the addition of an added prime marking.

As shown in FIG. 14, the control mechanism 10' includes a support housing 28', rotatable means 30', biased stop means 32', release means 34', advance means 36', operator control means 38', disengagement means 40' and overshift means 42' all of which are operable to provide upshift, downshift and overshift operations in the manner set forth above. However, as shown in FIG. 14, a first Bowden cable 15 extends from the handlebar mounted lever 17 and is secured to the operator control lever 110' by a cable clamp 140'. A second Bowden cable 14' has one end wrapped around a cable drum 62' and secured thereto by an anchor pin 72', in the manner described above with reference to FIGS. 1–3. The other end of the cable 14' is connected to the derailleur mechanism 16'.

The control mechanism 10' is secured to the bicycle frame 43 through the use of a suitable housing clamp 45, a bolt 46' and a nut (not shown) which is received on a threaded shank portion of bolt 46'.

The operation of the control mechanism 10' is generally similar to that of the control mechanism 10 shown in FIGS. 1–7 and accordingly, a detailed description of the operation is not presented herein. However, it is pointed out that the control mechanism 10' includes a stop pin 65 which limits counterclockwise rotation of the ratchet wheel 60'. Clockwise rotation of the ratchet wheel 60' is limited by latch pawl 76' not being able to engage surface 69 of the ratchet wheel 60'. Also, counterclockwise rotation of the operator control lever 110' is limited by pin 80'.

While the above embodiments of the present invention have been shown and described, it will be obvious to those skilled in the art that changes and modifications may be made without departing from the invention in its broader aspects and therefore the aim in the appended claims is to cover all such changes and modifications as fall within the scope of the invention.

What is claimed is:

1. In a control mechanism for a bicycle transmission adapted for positively and incrementally controlling the displacement of a biased transmission member or the like between a plurality of set positions comprising support means, rotatable means rotatably supported by said support means for movement in either of two opposite directions of rotation, said biased member being connected to said rotatable means to urge said rotatable means in one direction of rotation and being movable therewith, operator control means supported for unilateral movement from a rest position to at least a first position, a second position, and an overshift position, stop means pivotally connected to said support means for selectively engaging said rotatable means to prevent rotation of said rotatable means in the one direction of rotation, release means operably connected with said operator control means for selectively disengaging said stop means from said rotatable means in response to movement of said operator control means from said rest position to said first position, whereby said rotatable means is free to rotate in said one direction, advance means carried by said operator control means which drivingly engages said rotatable means in response to movement of said operator control means past said first position to said second position for driving said rotatable means in the other direction of rotation, means operatively connected to said support means for disengaging said advance means as said operator control means returns to said rest position, said stop means reengaging said rotatable means to positively retain said rotatable means in a particular position in response to said return of said operator control means to said rest position, and overshift means defining said overshift position, said operator control means when moved past said first and second positions to said overshift position moving said biased transmission member beyond one of said set positions, and when released and returned to said rest position effecting movement of said biased transmission member back to said one of said set positions.

2. In a control mechanism for a bicycle transmission adapted for positively and incrementally controlling the displacement of a biassed transmission member or the like associated with the bicycle transmission between a plurality of set positions for effecting changes in the gear ratios of the bicycle transmission comprising support means, rotatable means rotatably supported by said support means for movement in either of two opposite directions of rotation, said biassed transmission member being connected to said rotatable means for urging said rotatable means in one direction of rotation and being movable in unison therewith, operator control means operable in a unilateral movement from a rest position to at least a first position and a second position and being yieldingly biased in the opposite direction to said rest position, stop means pivotally connected to said support means for selectively engaging said rotatable means for preventing rotation of said rotatable means in the one direction of rotation, release means operably connected with said operator control means for selectively disengaging said stop means from said rotatable means in response to movement of said operator control means to said first position, whereby said rotatable means in free to rotate in the one direction, advance means carried by said operator control means which drivingly engages said rotatable means in response to movement of said operator control means past said first position to said second position for driving said rotatable means in the other direction of rotation whereby said biassed transmission member is at one of said set positions, and means operatively connected to said support means for disengaging said advance means as said operator control means returns to said rest position, said stop means reengaging said rotatable means to positively retain said rotatable means in a particular position in response to said return of said operator control means to said rest position.

3. A control mechanism as set forth in claim 2 which further comprises an overshift means including an abutment surface operatively connected to said support means and spaced from said second position by a predetermined distance such that whenever said operator control means is moved past said first and second positions it contacts said abutment surface, whereby said cable is moved beyond one of said set positions by a distance proportional to said distance between said second and overshift positions and is returnable to said one of said set positions in response to said return of said operator control means to said rest position.

4. A control mechanism as set forth in claim 3 in which said rotatable means includes at least one ratchet wheel having a plurality of discrete teeth located on the periphery thereof, and a rotatable drum connected to said ratchet wheel for movement in unison therewith, and in which said stop means includes a stop pawl and a biasing member which biases said stop pawl into selective engagement with respective ones of said teeth.

5. A control mechanism as set forth in claim 4 in which said advance means is positioned with respect to said teeth such that said advance means is positioned from a respective one of said teeth by a small distance whenever said operator control means is in said first position, whereby as said rotatable means rotates in said one direction a respective one of said teeth imparts a pulse to said advance means sufficient in magnitude to indicate to an operator that said first position has been reached.

6. A control mechanism as set forth in claim 4 in which said advance means is comprised of an advance pawl and a spring member connected to said advance pawl for biasing said advance pawl into engagement with respective ones of said teeth.

7. A control mechanism as set forth in claim 6 in which said release means is comprised of a release pawl and a spring member connected to said release pawl for biasing said release pawl in said one direction of rotation, and said operator control means is comprised of an operator control lever and a spring member connected thereto for yieldingly biasing said operator control lever to said rest position.

8. A control mechanism as set forth in claim 7 wherein both said advance and stop pawls are so positioned that end pressure on respective ones of said pawls at a point of contact with respective ones of said teeth will substantially act through the pivot center of each of said pawls thereby resulting in less wear on the teeth of said ratchet wheel.

9. A control mechanism as set forth in claim 8 in which said disengaging means is positioned between said ratchet wheel and said pivot pin for said advance pawl such that the pressure between said disengaging means and said advance pawl is effective whenever said advance pawl is moved into contact therewith to counterbalance the bias torque of said ratchet wheel which drives said operator control lever through said advance pawl in order to eliminate a sudden change of torque acting on said operator control lever at the instant of disengagement.

10. A control mechanism as set forth in claim 8 in which said stop pawl is positioned such that whenever said advance means is forced by said disengaging means to be disengaged from respective ones of said teeth a relatively small gap exists between an end of said stop pawl and an adjacent one of said teeth.

11. A control mechanism as set forth in claim 4 in which said predetermined distance is approximately 1⅔ the spacing between adjacent ones of said teeth.

12. A control mechanism as set forth in claim 3 in which said abutment surface can be moved with respect to said operator control means to thereby correspondingly vary said predetermined distance.

13. A control mechanism as set forth in claim 7 in which said release pawl is provided with an intermediate stop surface which engages said stop means whenever said operator control means is moved to contact said abutment surface.

14. A control mechanism as set forth in claim 2 wherein said support means has a stop surface which inhibits movement of said operator control means in the one direction and defines said rest position.

15. A control mechanism as set forth in claim 4 in which said rotatable means is defined by uninterrupted elongated surfaces on said ratchet wheel located adjacent ends of said ratchet teeth to prevent further incremental movement of said ratchet wheel.

16. A control mechanism as set forth in claim 4 in which said drum has an eccentrically shaped outer peripheral surface which varies the distance said cable moves during each incremental movement of said ratchet wheel.

17. A control mechanism as set forth in claim 2 wherein said rotatable means comprises a pair of ratchet wheels having a rotatable drum connected therebetween.

18. A control mechanism as set forth in claim 17 in which said drum has at least two projections, each of which is adapted to be detachably and slideably received within corresponding apertures in respective ones of said ratchet wheels.

19. A control mechanism as set forth in claim 6 in which said disengaging means is comprised of a projection member which extends from said support means and is located generally radially between said ratchet teeth and a pivot axis for said advance pawl, and in which said disengaging means acts to disengage said advance means whenever said operator control means is returned to said rest position.

20. A control mechanism as set forth in claim 17 in which each of said ratchet wheels has a slot formed thereon which receives an anchor lug attached to one end of said cable.

21. In a control mechanism for a bicycle transmission for positively and incrementally controlling the displacement of a biased transmission member or the like between a plurality of set positions comprising support means, rotatable means rotatably supported by said support means for movement in either of two opposite directions of rotation, said biased member being connected to said rotatable means to urge said rotatable means in one direction of rotation and being movable therewith, first means connected to said support means for selective engagement with said rotatable means and for movement from a rest position to at least a first position and an overshift position, and overshift means defining said overshift position, said first means being movable to said first position whereat said first means has drivingly rotated said rotatable means to move said biased transmission member to one of said set positions, said first means being movable past said first position to said overshift position to thereby move said rotatable means and said biased transmission member a given distance past one of said set positions, said biased transmission member being returned to said one of said set positions with return of said first means to said rest position.

22. A control mechanism as set forth in claim 21 in which said overshift means includes an abutment surface operatively connected to said support means.

23. A control mechanism as set forth in claim 21 in which said rotatable means includes at least one rotatable member having a plurality of discrete teeth located on the periphery thereof.

24. A control mechanism as set forth in claim 23 in which the distance between said first position of said first means and said overshift position is approximately equivalent to one-half of the spacing between adjacent ones of said teeth.

25. A control mechanism as set forth in claim 22 in which said abutment surface can be adjusted with respect to said first position to thereby vary said distance between said first position and said overshift position.

26. In a control mechanism adapted for a bicycle transmission for positively and incrementally controlling the displacement of a biased transmission member or the like between a plurality of set positions for changing the gear ratios of the transmission comprising support means, rotatable means rotatably supported by said support means for movement in either of two opposite directions of rotation, said biased member being connected to said rotatable means to urge said rotatable means in one direction of rotation and being movable therewith, and first means connected to said support means for selective engagement with said rotatable means and for unilateral movement from a rest position to at least first and second positions, said first means being movable to said first position whereat said first means is out of driving engagement with said rotatable means and said rotatable means is free to rotate in the one direction to thereby permit said biased member to move by virtue of its being biased to a first of said set positions, said first means drivingly engaging said rotatable means in response to movement thereof past said first position to said second position whereat said rotatable means moves in the other direction of rotation to thereby move said biased transmission member to a second of said set positions.

27. A control mechanism as set forth in claim 26 wherein said first means includes an operator control means being connected to said support means, and an advance means carried by said operator control means for selectively drivingly engaging said rotatable means in response to movement of said operator control means past said first position.

28. A control mechanism as set forth in claim 26 which further comprises stop means pivotally connected to said support means for selectively engaging said rotatable means to prevent rotation of said rotatable means in the one direction of rotation, and release means operably connected with said operator control means for selectively disengaging said stop means from said rotatable means in response to movement of said operator control means to said first position.

29. A control mechanism as set forth in claim 28 which further comprises means operatively connected to said support means for disengaging said advance means as said operator control means returns to said rest position, said stop means reengaging said rotatable means to positively retain said rotatable means in response to said return of said operator control means moving in the one direction of rotation to said rest position.

30. In a control mechanism for a bicycle transmission adapted for incrementally and positively controlling displacement of a biased transmission member between a plurality of individually set positions for effecting changes in the gear ratio of the bicycle transmission comprising a support means, a rotatable means rotatably supported by said support means and being movable in either of two directions of rotation between a plurality of discrete operative positions, said biased member being connected to said rotatable means to normally urge said rotatable means in one of two directions of rotation, first means connected to said support means for selective engagement with said rotatable means and for movement from a rest position to at least a first position and a second position, said first means being movable to said first position to disengage said first means from said rotatable means, whereby said rotatable means is movable toward one of said operative positions and said biased member is moved to one of said set positions to effect a change in the gear ratio of said transmission, said first means being movable past said first position to said second position to drivingly engage and move said rotatable means to another of said operative positions, and thereby move said biased member to another of said set positions to effect a further change in the gear ratios.

31. A control mechanism in combination with a bicycle for effecting rotational motion of a rotatable member rotatably supported by a support means on said bicycle, the improvement comprising bias means connected to said rotatable member to normally urge said rotatable member in one direction of rotation, and pawl means mounted on said support means first means mounted on said support means for selective engagement with said rotatable means and for movement from a rest position to at least a first position and a second position, said first means being movable to said first position to disengage said pawl means from said rotatable member whereby said rotatable member is free to rotate in said one direction of rotation under the force of said bias means, said first means drivingly engaging said rotatable member in response to movement thereof past said first position to said second position to move said rotatable member in the opposite direction of rotation.

32. A mechanism in combination with a bicycle for effecting rotational motion of a ratchet means including a ratchet adapted to be mounted on a support means on said bicycle, the improvement comprising first pawl means for controlling forward rotation of said ratchet, lever means adapted to be pivotally mounted on said support means for reciprocative pivotal movement between first and second positions through respective short and long arcuate paths, said first pawl means controlling forward rotation of said ratchet as said lever means moves reciprocatively between said rest position and said first position, second pawl means carried by said lever means and being normally disengaged from said ratchet for moving with said lever means to engage drivingly said ratchet to move said ratchet in the reverse direction in response to movement of said lever between said rest position and said second position.

33. A mechanism as set forth in claim 32 wherein said first pawl means includes a first pawl supported by said support means for normally engaging said ratchet and a second pawl carried by said ratchet and movable therewith to disengage said first pawl from said ratchet whenever said lever means is moved to said first and second positions.

* * * * *